United States Patent Office 3,414,653
Patented Dec. 3, 1968

3,414,653
COMPOSITIONS AND METHODS FOR CONTROLLING FUNGI USING 3-IMINO-1,2-DITHIOLE COMPOUNDS
Johannes Th. W. Montagne and Barrington Cross, Sittingbourne, England, assignors to Shell Oil Company, New York, N.Y., a corporation of Delaware
No Drawing. Filed Dec. 1, 1966, Ser. No. 598,222
Claims priority, application Great Britain, Dec. 6, 1965, 51,574/65
14 Claims. (Cl. 424—277)

ABSTRACT OF THE DISCLOSURE 3-imino-1,2-dithiole compounds useful as fungicides, such as 3H-1,2-benzodithiol-3-one oxime.

---

This invention relates to the protection of plants from attack by fungi, particularly mildews.

The fungicides provided by this invention can be characterized by the general formula:

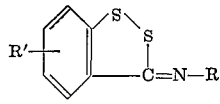

wherein R is hydroxyl, phenyl, chlorophenyl or nitrophenyl and R' is hydrogen, chlorine, nitro or amino ($-NH_2$).

Certain of these compounds can exist in two stereoisomeric forms. This stereoisomerism is analogous to that occurring in oximes, and hence the isomers are known as the syn and anti forms. When such isomerism exists, both the syn and anti forms fall within the scope of this invention, together with mixtures (racemic and otherwise) of these isomers.

These compounds are active with respect to a wide range of fungi, for example, foliage fungi such as *Podosphaera leucotricha, Uncinula necator, Erysiphe cichoracearum, Phytophthora infestans, Perenospora viticola, Alternaria brassicicola* and *Venturia inaequalis*; soil fungi such as *Pythium irregulare*; and fungi causing spoilage of stored products, particularly food products such as *Aspergillus niger, Penicillium roqueforti* and *Rhizopus nigricans*.

The fungicides of this invention can be applied to the locus of the fungi by any of the conventional techniques used for the application of surface fungicides. They thus can be formulated as dusts or as liquids—i.e., with a suitable carrier—and applied by dusting, spraying, dipping or by any other appropriate technique.

The term "carrier" as used herein means a material, which may be inorganic or organic and of synthetic or natural origin, with which the active compound is mixed or formulated to facilitate its application to the plant, seed, soil or other object to be treated or its storage, transport or handling. The carrier may be a solid or a fluid. Any of the materials usually applied in formulating pesticides may be used as carrier.

Examples of suitable solid carriers are silicates, clays, for example, kaolinite clay, synthetic hydrated silicon oxides, synthetic calcium silicates, elements such as for example, carbon and sulfur, natural and synthetic resins such as for example, coumarone resins, rosin, copal, shellac, dammer, polyvinyl chloride and styrene polymers and copolymers, solid polychlorophenols, bitumen, asphaltite, waxes such as for example, beeswax, paraffin wax, montan wax and chlorinated mineral waxes, and solid fertilizers, for example, superphosphates.

Examples of suitable fluid carriers are water, alcohols, such as for example, isopropanol, ketones such as for example, acetone, methyl ethyl ketone, methyl isobutyl ketone and cyclohexanone, ethers, aromatic hydrocarbons such as for example, benzene and toluene, petroleum fractions such as for example, kerosine, chlorinated hydrocarbons, such as for example, carbon tetrachloride, including liquefied normally vaporous or gaseous organic compounds. Mixtures of different liquids are often suitable.

The surface active agent may be a wetting agent, an emulsifying agent or a dispersing agent; it may be nonionic or ionic. Any of the surface active agents usually applied in formulating herbicides or insecticides may be used. Examples of suitable surface active agents are the sodium or calcium salts of polyacrylic acids, the condensation products of fatty acids or aliphatic amines or amides containing at least 12 carbon atoms in the molecule with ethylene oxide and/or propylene oxide; partial esters of the above fatty acids with glycerol, sorbitan, sucrose or pentaerythritol; condensation products of alkyl phenols, for example, p-octylphenol or p-octylcresol, with ethylene oxide and/or propylene oxide; sulfates or sulfonates of these condensation products; and alkali metal salts, preferably sodium salts, or sulfuric acid esters or sulfonic acids containing at least 10 carbon atoms in the molecule, for example, sodium lauryl sulfate, sodium secondary alkyl sulfates, sodium salts of sulfonated castor oil, and sodium alkylaryl sulfonates such as sodium dodecylbenzene sulfonate.

The formulations of the invention may be in the form of wettable powders, dusts, granules, solutions, emulsifiable concentrates and emulsions.

The formulations of the invention may contain other ingredients, for example, protective colloids such as gelatin, glue, casein, gums and polyvinyl alcohol; sodium polyphosphates; cellulose ethers, stabilizers such as ethylene diamine tetra-acetic acid; other herbicides or pesticides; and stickers, for example non-volatile oils.

Aqueous dispersions and emulsions, for example, compositions obtained by diluting a wettable powder or an emulsifiable concentrate according to the invention with water, also lie within the scope of the present invention. The said emulsions may be of the water-in-oil or of the oil-in-water type, and may have a thick, "mayonnaise"-like consistency.

The quantity of the fungicide required to effectively control fungi will vary, depending upon a number of factors, including the particular species of fungus, the nature of the object being attacked by the fungus—including whether living or nonliving—whether the fungicide is being applied to control an already existing attack, or to prevent attack, the degree of attack, etc. All of these factors are well known to those versed in the art, and their resolution is readily attained by those versed in the art. So, likewise, the concentration of fungicide in the formulation used can vary considerably. The concentration of the fungicide in the pre-prepared formulation can range from less than 1 percent by weight to as much as 90% by weight of the formulation. In the formulation to be applied, the concentration of fungicide generally is less than 5 percent by weight, most often being of the order of less than 1 percent by weight—for example, from about 0.01 to 1 percent by weight—of the formulation.

Suitable methods for preparing these fungicides are illustrated by the following examples, which show the preparation of typical specific members of the class. In these examples, parts by weight (w.) bear the same relationship to parts by volume (v.) as does the kilogram to the liter.

Example I.—Preparation of 3H-1,2-benzodithiol-3-one oxime

A mixture of 3H-1,2-benzodithiol-3-thione (3 w.), sodium acetate (6 w.), hydroxylamine hydrochloride (6.9 w.) and ethyl alcohol (120 v.) was heated under reflux, with stirring, for 10 minutes. The reaction mixture was filtered and the filtrate was diluted with water when 3H-1,2-benzodithiol-3-one oxime precipitated as a yellow solid. The compound was purified by crystallization from alcohol to give yellow meedles, M.P. 204–205° C.

*Analysis (weight percent)*.—Found: C, 45.4; H, 2.9; N, 7.4; S, 34.3. $C_7H_5NS_2O$ requires: C, 45.9; H, 2.9; N, 7.6; S, 34.8.

Example II.—Preparation of 3-(4-chlorophenylimino)-3H-1,2-benzodithiole p-Chloroaniline (2.5 w.) was dissolved in a mixture of pyridine (2.5 v.) and glacial acetic acid (5 v.) and the solution added to 3-methylthio-3H-1,2-benzodithiolylium methylsulfate (3 w.) in glacal acetic acid (13 v.). This reaction mixture was heated under reflux for 15 minutes, cooled to 80° C. and two drops of water were added.

The yellow precipitate which formed was filtered off and crystallized from ethanol to give 3-(4-chlorophenylimino)-3H-1,2-benzodithiole, M.P. 122.5–123° C.

*Analysis (weight percent)*—Found: C, 56.2; H, 2.8; N, 5.0; S, 23.1; Cl, 13.1. $C_{13}H_8NS_2Cl$ requires: C, 56.2; H, 2.9; N, 5.0; S, 23.2; Cl, 12.8.

Example III.—Preparation of further derivatives of 3-imino-1,2-dithiole

The compounds shown in Table I other than the compounds of Examples I and II were prepared using the methods, or obvious extensions to the methods, described for the compounds of Examples I and II.

The fungicidal effectiveness of the fungicides of this invention is demonstrated in the following examples, which show the results of testing of typical members of this class of fungicides.

Example IV.—Determination of the activity of the 3-imino-1,2-dithiole derivatives as foliage fungicides Samples of fungicides of the invention were dissolved in aqueous acetone (water:acetone 9/1 v./v.) containing 0.001% Triton X–100 as wetting agent. These solutions, containing 0.1% active ingredient, were then used to spray tomato and cucumber plants.

One day after spraying the tomato and cucumber plants were inoculated with a suspension of *Phytophthora infestans* zoospores and dry conidiospores of *Erysiphe cichoracearum* respectively. After inoculation the tomato plants were kept in a glasshouse under conditions of high humidity, and the cucumber plants were kept at normal glasshouse air humidity. Four days after inoculation in the case of the tomatoes and 10 days after inoculation in the case of the cucumbers the incidence of disease was assessed. The results are shown in Table I, where + indicates between 80% and 100% control of the disease.

and allowed to dry before being inoculated with an aqueous suspension of *Alternaria brassicicola* spores. After incubation in a moist chamber the leaves were dried, the spores were removed by means of a thin film of collodion and spore germination was determined microscopically. The results are shown in Table I in which + indicates more than 95% inhibition of spore germination.

Example VI.—Determination of the activity of the 3-imino-1,2-dithiole derivatives against *Aspergillus niger*

An absorbent disc saturated with a solution of the test compound in aqueous acetone was placed in a malt-agar slope seeded with conidiospores of *Aspergillus niger*. After 7 days the growth of the fugus was observed. The results are shown in Table I in which + indicates strong inhibition of growth.

Example VII.—Determination of the activity of the 3-imino-1,2-dithiole derivatives against *Venturia inaequalis*

Compounds of the invention were dissolved or suspended in aqueous acetone (water:acetone 9/1 v./v.) containing 0.001% Triton X–100 as wetting agent at a concentration of 0.1%. This dispersion was used to spray detached apple leaves and the leaves allowed to dry. The treated leaves were inoculated by spraying them with a dense suspension of spores of *Venturia inaequalis*, the apple scab fungus. The wet leaves were incubated for 24 hours at 23° C. in petri dishes lined with wet filter paper. After incubation the leaves were dried and spore samples taken in a collodion film. Pieces of the collodion film were mounted in cotton blue solution in lactophenol on a microscope slide and the spore germination counted under a microscope. The results obtained are shown in Table I, where + indicates 90% to 100% control of the fugus.

Example VIII.—Determination of the activity of 3H-1,2-benzodithiol-3-one oxime against *Perenospora viticola*

The following components were blended in a ribbon blender and the mixture subsequently hammer-milled to the desired particle size.

|  | Percent |
| --- | --- |
| 3H-1,2-benzodithiol-3-one oxime | 50 |
| Tamol 731 | 3 |
| Empicol LZ | 2 |
| Microcel 8E | 45 |

Tamol 731 (registered trademark) is an anionic surface active agent, comprising polymethylacrylate, Empicol LZ (registered trademark) is a surface active agent comprising sodium lauryl sulfate and Microcel 8E (registered trademark) comprises a synthetic calcium silicate filler.

This wettable powder composition was diluted with water to give a suspension containing 50 p.p.m. active

TABLE I

| Compound | Fungicidal activity | | | | |
| --- | --- | --- | --- | --- | --- |
|  | *Aspergillus niger* | *Alternaria brassicicola* | *Phytophthora infestans* | *Erysiphe cichoracearum* | *Venturia inaequalis* |
| 3H-1,2-benzodithiol-3-one oxime | + | + | + | + | + |
| 3-(phenylimino)-3H-1,2-benzodithiole |  |  |  | + |  |
| 3-(4-chlorophenylimino)-3H-1,2-benzodithiole |  |  |  | + |  |
| 3-(2-nitrophenylimino)-3H-1,2-benzodithiole |  |  |  | + |  |
| 6-amino-3H-1,2-benzodithiol-3-one oxime |  |  | + |  | + |
| 6-nitro-3H-1,2-benzodithiol-3-one oxime |  |  | + | + | + |
| 5-chloro-3H-1,2-benzodithiol-3-one oxime |  |  | + | + |  |

Example V.—Determination of the activity of the 3-imino-1,2-dithiole derivatives in preventing fungal spore germination Detached leaves from wallflower plants were dipped in a solution containing 0.5% of the 1,2-dithiol-3-one derivatives, and Triton X–100 (0.01%) in aqueous acetone material. This suspension was used to spray young vine plants grown in a glasshouse. The plants were then inoculated with a spore suspension of *Perenospora viticola* (vine downy mildew) and maintained in the glasshouse for a further 12 days under conditions of high humidity.

At the end of this period the plants were completely free from disease while plants which had been inoculated but not sprayed, were heavily infected.

We claim as our invention:

1. A fungicidal formulation comprising a compound of the formula

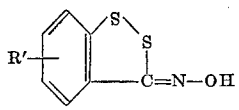

wherein R' is hydrogen, chlorine, nitro or amino; a horticultural carrier selected from the group consisting of (a) inert dusts and (b) liquids of the group consisting of methyl ethyl ketone, methyl isobutyl ketone, cyclohexanone, ethers, aromatic hydrocarbons, petroleum fractions, chlorinated hydrocarbons and mixtures thereof; and a surface active agent; the concentration of said compound in said formulation amounting to from about 0.01 to about 90 percent of the weight thereof.

2. The fungicidal formulation of claim 1 wherein R' is hydrogen.

3. A fungicidal formulation comprising a compound of the formula

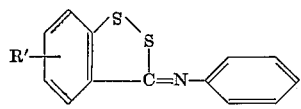

wherein R' is hydrogen, chlorine, nitro or amino; a horticultural carrier selected from the group consisting of (a) inert dusts and (b) liquids of the group consisting of methyl ethyl ketone, methyl isobutyl ketone, cyclohexanone, ethers, aromatic hydrocarbons, petroleum fractions, chlorinated hydrocarbons and mixtures thereof; and a surface active agent; the concentration of said compound in said formulation amounting to from about 0.01 to about 90 percent of the weight thereof.

4. A fungicidal formulation comprising a compound of the formula

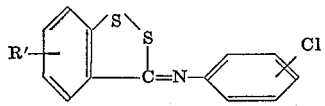

wherein R' is hydrogen, chlorine, nitro or amino; a horticultural carrier selected from the group consisting of (a) inert dusts and (b) liquids of the group consisting of methyl ethyl ketone, methyl isobutyl ketone, cyclohexanone, ethers, aromatic hydrocarbons, petroleum fractions, chlorinated hydrocarbons and mixtures thereof; and a surface active agent; the concentration of said compound in said formulation amounting to from about 0.01 to about 90 percent of the weight thereof.

5. A fungicidal formulation comprising a compound of the formula

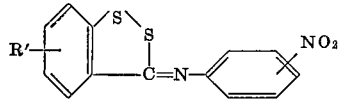

wherein R' is hydrogen, chlorine, nitro or amino; a horticultural carrier selected from the group consisting of (a) inert dusts and (b) liquids of the group consisting of methyl ethyl ketone, methyl isobutyl ketone, cyclohexanone, ethers, aromatic hydrocarbons, petroleum fractions, chlorinated hydrocarbons and mixtures thereof; and a surface active agent; the concentration of said compound in said formulation amounting to from about 0.01 to about 90 percent of the weight thereof.

6. A method of controlling noxious fungi comprising subjecting the fungi to the action of a fungicide of the formula

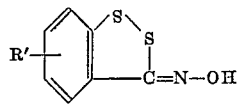

wherein R' is hydrogen, chlorine, nitro or amino.

7. The method of claim 6 wherein the fungicide is 3H-1,2-benzodithiol-3-one oxime.

8. The method of claim 6 wherein the fungicide is 6-amino-3H-1,2-benzodithiol-3-one oxime.

9. The method of claim 6 wherein the fungicide is 6-nitro-3H-1,2-benzodithiol-3-one oxime.

10. The method of claim 6 wherein the fungicide is 5-chloro-3H-1,2-benzodithiol-3-one oxime.

11. A method of controlling noxious fungi comprising subjecting the fungi to the action of a fungicide of the formula

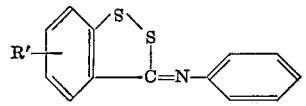

wherein R' is hydrogen, chlorine, nitro or amino.

12. The method of claim 11 wherein the fungicide is 3-(phenylimino)-3H-1,2-benzodithiole.

13. A method of controlling noxious fungi comprising subjecting the fungi to the action of a fungicide of the formula

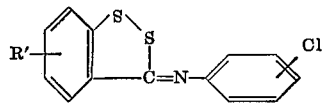

wherein R' is hydrogen, chlorine, nitro or amino.

14. A method of controlling noxious fungi comprising subjecting the fungi to the action of a fungicide of the formula

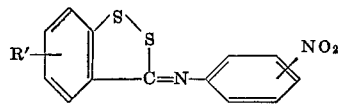

wherein R' is hydrogen, chlorine, nitro or amino.

References Cited

Chem. Abst., vol. 27, pages 2682–2683 (1933).
Chem. Abst., vol. 30, page 75733 (1936).

ALBERT T. MEYERS, *Primary Examiner.*

S. FRIEDMAN, *Assistant Examiner.*